United States Patent
Gorti et al.

(10) Patent No.: US 7,620,058 B2
(45) Date of Patent: Nov. 17, 2009

(54) SYSTEM AND METHOD FOR CONFIGURING AND OPERATING A NETWORK BASED TELEPHONE SYSTEM

(75) Inventors: Sreenivasa Rao Gorti, Austin, TX (US); David Patron, Cedar Park, TX (US); Anil Kumar Doradla, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 948 days.

(21) Appl. No.: 11/121,315

(22) Filed: May 3, 2005

(65) Prior Publication Data
US 2006/0251229 A1  Nov. 9, 2006

(51) Int. Cl.
*H04L 12/66* (2006.01)
(52) U.S. Cl. ............. 370/401; 370/352; 370/410; 379/413.02; 379/413.04
(58) Field of Classification Search ........... 379/157, 379/159, 160, 164, 165, 166, 167, 167.11, 379/167.12, 171, 201.01, 413.02, 413.04; 370/352–356, 401, 410
See application file for complete search history.

(56) References Cited

U.S. PATENT DOCUMENTS

| | | | |
|---|---|---|---|
| 5,309,509 A * | 5/1994 | Cocklin et al. ........... 379/165 |
| 6,317,884 B1 * | 11/2001 | Eames et al. ............. 709/217 |
| 6,680,935 B1 * | 1/2004 | Kung et al. ............... 370/352 |
| 2002/0073434 A1 * | 6/2002 | Pience ..................... 725/119 |
| 2003/0200298 A1 | 10/2003 | Su et al. |
| 2004/0259541 A1 | 12/2004 | Hicks, III et al. |
| 2006/0159116 A1 * | 7/2006 | Gerszberg et al. ........ 370/431 |
| 2006/0187954 A1 * | 8/2006 | Braschi et al. ........... 370/463 |
| 2006/0251094 A1 * | 11/2006 | Van Vleck et al. ........ 370/419 |
| 2008/0048861 A1 * | 2/2008 | Naidoo et al. ............ 340/541 |
| 2008/0049779 A1 * | 2/2008 | Hopmann et al. ........ 370/431 |
| 2009/0019141 A1 * | 1/2009 | Bush et al. ............... 709/223 |

* cited by examiner

*Primary Examiner*—Binh K Tieu
(74) *Attorney, Agent, or Firm*—Toler Law Group

(57) ABSTRACT

The present disclosure provides a system and method to configure and operate a residential local area network (LAN) based telephone system. The illustrated system provides a residential gateway configured to receive a telephone call and process the call based on user configured options. The user-configured options can be provided by telephony feature processing modules (TFPMs) that operate in a Session Initiated Protocol Proxy Framework (SIP-PF). The TFPMs can send, receive and process calls and call data to control network devices such as network telephones.

32 Claims, 3 Drawing Sheets

SYSTEM AND METHOD FOR CONFIGURING AND OPERATING A NETWORK BASED TELEPHONE SYSTEM

FIELD OF THE DISCLOSURE

The present disclosure relates generally to telephone systems and more particularly to a system and method for configuring and operating a network based telephone system.

BACKGROUND

Telephone systems continue to improve and provide users with enhanced functions and new features. More particularly, commercial and/or business phone systems continue to provide expanded features and services. However, the features provided via home-based telephone systems have not expanded at the same rate as commercial offerings. This may be due, in part, to the fact that home systems do not have the same requirements as commercial systems and that commercial systems are generally too expensive for most homeowners. Accordingly, current residential or home-based phone systems lack many desirable features. Unfortunately, current techniques for managing large-scale networked telephony may not be capable of efficiently supporting desired features in a home-based system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Figure 1:
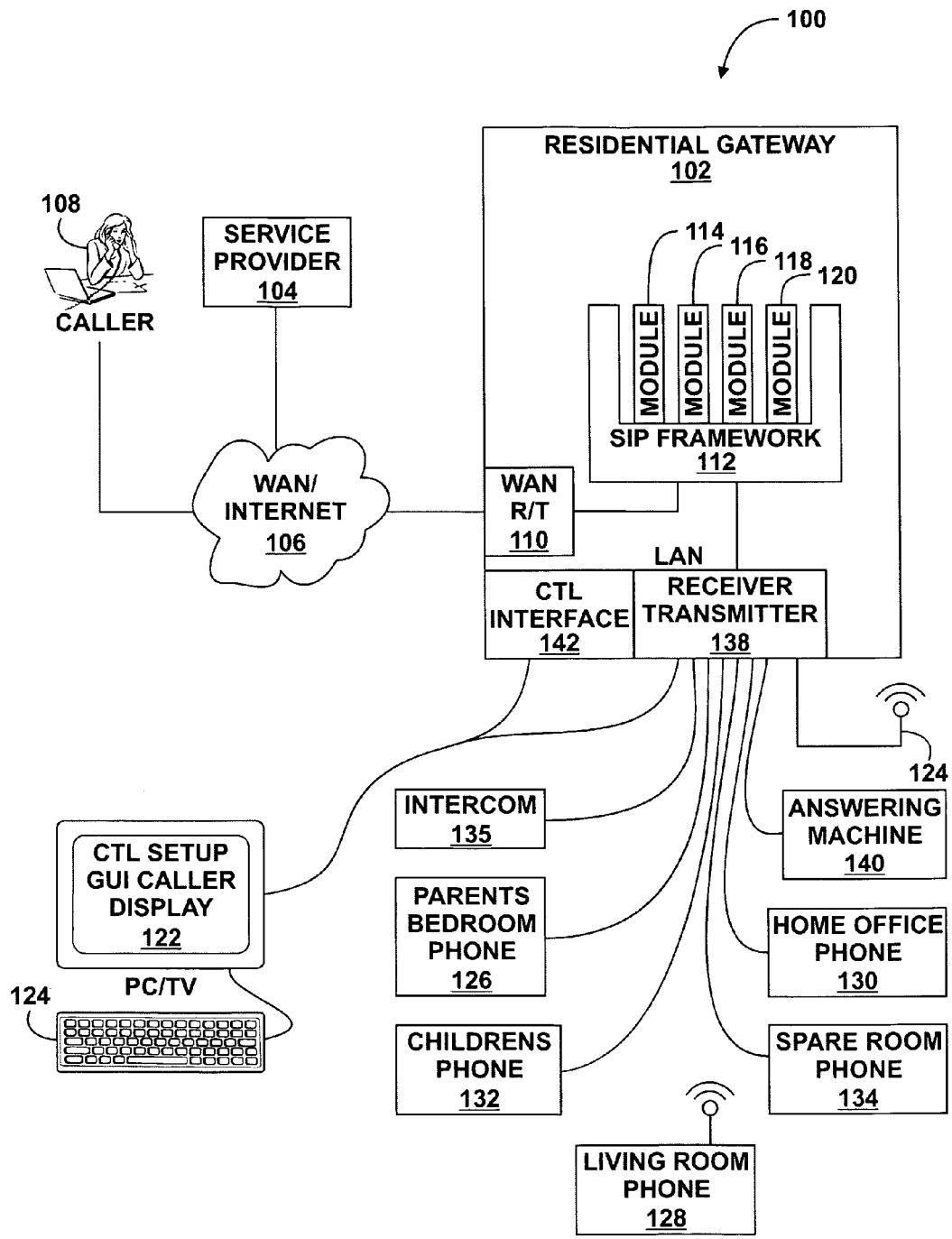
FIG. 1 illustrates a simplified configuration of an in home telephone network.

In one embodiment of a home-based telephony offering that incorporates teachings of the present disclosure, a solution may be deployed that provides a system and method to configure and operate a residential local area network (LAN) based telephone system. The illustrated solution of FIG. 1 may, for example, provide a residential gateway configured to receive a telephone call and process the call based on user-configured options. The user-configured options may be provided by telephony feature processing modules (TFPMs) that operate in a Session Initiated Protocol Proxy Framework (SIP-PF). The TFPMs may be capable of controlling network devices such as network telephones by sending, receiving, and processing calls and call data.

Depending upon implementation detail, the residential gateway can receive incoming telephone calls from a public telephone network and provide call information to the SIP-PF. The SIP-PF may then select one, or a plurality of TFPMs to process the call, wherein the TFPMs process the call based on some pre-defined and/or user selected configuration. A given TFPM may then transmit control signals and data to network devices such as network telephones. In some embodiments, a TFPM may share data when interacting with other TFPMs. In practice, one or more TFPMs may be activated sequentially, may respond to communications between network devices such as phones or other network devices internal to the system, and/or may be upgradeable via local and/or remote software downloads. Moreover, selected or activated features may be linked to and/or provided by individual TFPMs.

In one example, a user-selected option may configure the LAN based phones to operate as an intercom or paging system. The intercom configuration may allow a phone in a children's room to be activated as a baby monitor, providing for example one-way communications to a phone in the parent's bedroom. In other embodiments, a network phone could activate a "speaker phone" on other network devices including a network device at the entrance to the home, such that an intercom is provided at the front door and throughout the home. If cameras and monitors are connected to the system, a videophone configuration could be utilized to complement the intercom option and the caller ID option.

Another user-selected option may involve configuring a distinct ringing sequence for one or more network telephones. For example, a specific phone may ring based on the caller ID of the incoming call or a first phone may ring twice then another phone may ring twice and so on. These options are often referred to as selective ringing and sequential ringing respectively. A distinctive ring configuration could also be provided wherein a different ring tone or a series of notes (e.g., a song) are provided at specified phones based on a caller ID of the incoming call. Additional features may include different ring back audio (i.e. the tone that the caller hears when a called phone is ringing) or possibly a verbal ring back/feedback (e.g., "I am checking to see if the called party is home").

Further, some phones could be set not to ring during certain time periods or not ring based on specified caller IDs. For example, the ringer on a phone in a baby's room could be muted during nap time or a phone in a parents bedroom could be set not to ring between 10:00 (ten o'clock) PM and 8:00 (eight o'clock) AM on a particular day of the week. Other ringing sequences can include phones being set to not ring when calls from telemarketers are received.

In yet another user selectable configuration, messaging services such as message routing to specific answering machine and voicemail boxes, outgoing messages based on caller ID, video message routing, and selective messaging can be provided. Selective messaging can include providing outgoing messages based on caller ID and/or the time of day/month.

Users may also be able to select parental controls for network devices such as network telephones and answering machines. For example, a parent can limit whom a child talks to and the amount of time a child utilizes the phone or place time of day restrictions on a child's phone and what messages the child has access to.

Additional user configured options may include direct or remote access to caller ID information, photo ID, address books, messages, call forwarding, fire and burglar alarm status or notification, call logs. The remote control features may include an interactive address book that prompts a user for storing and organizing call information and photo or voice caller ID information wherein photos or voices are provided to the user when there is an incoming call.

In one embodiment, a TFPM may be configured as a virtual private network (VPN) client wherein specific calls and transactions can be performed in a secure environment. In another embodiment, a TFPM can be configured as a firewall and in yet another embodiment a TFPM may embody a voice recognition module embedded in an interactive voice response system.

Depending upon implementation detail, to set up the customized user configurations, a graphical user interface that graphically represents a local area network (LAN) could be utilized. To enable features such as the features described above, a user can select a function that is desired and then select the network phone(s) that will be provided with such features. In another embodiment, a user can utilize the graphical user interface to select a network device and then select a feature to be applied to the network device.

In one configuration, after feature selection by a user, executable code for the TFPMs may be automatically downloaded from a website over a wide area network and stored locally at the residential gateway. In another configuration, the features may be preloaded or loadable on the residential gateway and when selected, the feature becomes activated.

Referring to FIG. 1 an illustrated system 100 for controlling communications within a residential premise utilizing a residential gateway or the like is provided. As dill be discussed in more detail with reference to FIG. 2 below, a user may custom configure the operation and features provided by the system 100.

Many features may be provided by system 100. Some features may come standard. Some may be pre-activated while others may be subsequently activated. In addition, some features may not be included in the "as provided" system but may be added using a remote upgrade procedure. As will appreciated, specific operational decisions may be made by system designers to facilitate deployment and/or management of system 100. For example, a system designer may decide how features are acquired, added, deleted, provided, and/or modified. In light of the various options taught herein, specific techniques or options described in more detail below should not be utilized to limit the scope of the present invention. The specific techniques and implementations discussed with reference to the Figures are provided to assist the reader in understanding the teachings disclosed.

In one configuration, system 100 receives a call from caller 108 via a wide area network (WAN)/Internet 106 at a WAN receiver transmitter (R/T) 110, and the call is conveyed to a Session Internet Protocol—Processing Framework (SIP-PF) 112. In one embodiment, SIP-PF 112 may be referred to as a central soft switch for managing communication sessions. In practice, it may initiate or respond to a call for an interactive user session and provide for transmission and reception of multimedia elements such as streaming video, pictures, text, and voice. In addition to receiving and managing incoming signals, SIP-PF 112 may also process requests from local clients (network devices) and help establish, modify, and/or terminate, multimedia sessions or Internet telephony calls.

In operation, an SIP-PF 112 "request-response" protocol may invite disparate network devices within a local network to participate in a session and to begin establishing call parameters at either end of a communication link. Depending upon implementation detail, SIP-PF 112 may assign SIP universal resource locators (URLs) or private Internet protocol addresses for LAN-side network devices to facilitate communications with other devices, either within or outside the LAN associated with SIP-PF 112. In practice, SIP-PF 112 may make decisions, control data traffic, (including traffic to and from the Internet 106), and activate and control TFPMs such as first TFPM 114, second TFPM 116, third TFPM 118 and fourth TFPM 120.

In one configuration, incoming calls may be routed to SIP-PF 112 via WAN R/T 110. In response to some call data (e.g., CallerID, call time, etc.) and some user-selected features, SIP-PF 112 may communicate appropriate information to one or more of TFPMs 114-120, which may treat the call and control LAN-side devices according to a custom user configuration.

The term "call" as utilized here should be afforded a very broad meaning. In addition to Plain Old Telephony (POTs) calls, a call could be a signal (a SIP based signal) from a local network device such as an intercom for internal LAN communications, a wireless signal for a LAN connection, a fire alarm signal, and/or any signal that requests a communication session with the SIP-PF 112.

In one embodiment, SIP-PF 112 may be a processing platform that includes a processor to process transactions and a memory to store instruction for the processor. In this embodiment, TFPMs 114-120 may be implemented as programming objects, and the objects can be called by the processor of SIP-PF 112 based on a selected configuration. In another embodiment the TFPMs 114-120 may be circuit cards that are plugged into a back plane of a motherboard.

As depicted, LAN R/T 138 may be coupled to network devices such as a parent's bedroom phone 126, home office phone 130, spare bedroom phone 134, children's phone 134, children's intercom 135 and living room phone 128. The network devices 114-120 may be coupled via a wire or a wireless link such as that supported by antenna 136. In accordance with one embodiment of the present disclosure, the system can be configured to communicate with multiple wireless devices such as a cordless telephone. In one configuration, "WiFi" compliant devices as described in a publication 802.11. of the Institute of Electronics and Electrical Engineers could be utilized in accordance with the illustrated embodiment.

In a typical operation, a call and its associated call data are processed by TFPMs 114-120 wherein the step of processing can include attaching control data and routing information about the call as embedded data. The routing and control data may allow "phone ringing" within the home to be controlled as the data stream is forwarded to network devices 122-140 via local area network (LAN) receiver transmitter (R/T) 138. Network devices 122-140 coupled to the LAN may respond to the control signals by ringing, displaying information, sending audio and video and/or receiving audio and video over the LAN. Likewise, network devices 114-120 may initiate a call and call data. The call and associated data may then be sent to SIP-PF 112 for routing, processing or distribution, which may or may not involve TFPMs 114-120.

Depending upon implementation detail, network devices 122-140 can register with the SIP-PF and be assigned, or provided with user names, Internet protocol (IP) addresses, private IP addresses and/or Session Initiated Protocol-Universal Resource Indicators (SIP-URI). The assigned address facilitates sending call signals to the appropriate network device and assists in implementing features according to a user's selections.

In one configuration, when caller 108 makes a call that is received by residential gateway 110 and call data such as caller ID data is provided to the SEP-PF 112, first module 114 may utilize the caller ID to link the call from a particular person or business to a particular phone. Based on a user-selected configuration, the user may have designated calls having a specific caller ID number to be routed to a specific phone such as home office phone 130. Thus, first TFPM 114 may attach the network address of the home office phone 130 to the call and send the call over the LAN, wherein the home office phone 130 would ring. If unanswered a designated TFPM could take a message. In one embodiment, the caller ID that is associated with home office phone 130 may also be utilized to selectively ring other telephones or forward/transfer the call to a cellular phone or pager if the office phone 130 is not answered.

In another example, the processing modules can be configured such that when the home office phone 130 rings two times and is unanswered, the call may be transferred to the parent's bedroom phone 126 wherein the parent's bedroom phone 126 would ring twice, and then the living room phone would ring before a message is taken. Such a sequential ringing configuration may help minimize unwanted overlapping of business calls and personal calls. In another configuration, after the call is unanswered for a specific number of rings, the call could be transferred to particular voice mailbox in a stand-alone answering machine 140. These features allow calls coming from an employer, a client, or a customer to be handled in a manner wherein it can be transparent to a caller that they are calling a residence.

Additionally, TFPMs 114-120 can be configured to identify telemarketers and cold sales calls and provide them with a selective message that sales calls are not welcome. For example, telemarketers sales calls often originate from an 800 series number, thus, the user could assign an outgoing message for call that are incoming with a caller ID having an 1-8XX as the first two digits. In another embodiment, a different outgoing message can be sent to clients, customers, friends, or relatives based on call data such as caller identification. In yet another embodiment the outgoing message can be provided based on the time of day, week or month that the call is received.

In another embodiment, specific phones could be set with a time based "ring mute" such that they do not ring during certain time periods, for example between eleven o'clock at night and nine o'clock in the morning. In yet another configuration, a specific phone can be set not to ring during specific time period. For example, if a baby routinely takes a nap in the afternoon, the phone in the baby's room can be set to do not disturb during that time period. Calls forwarding features can also be provided by the TFPMs 114-120 on a time basis or for unanswered calls.

In yet another embodiment, a fire alarm, a carbon dioxide alarm, a burglar alarm, a disaster warning system, a radio, a compact disk player, or other digital music system can be coupled to a selected network device or phone to provide audio to a particular location within the home. A voice recognition system could be implemented in TFPMs to provide text messages generated from a voice and other call processing features.

The home telephone network taught herein can also provide features such as internal LAN based switching and messaging. For example, the parent could set a network device such as a phone to perform as an intercom as illustrated by intercom 135. Additionally the intercom 135 could perform as a "baby monitor." In accordance with an intercom feature, the phone located in the children's room could act as a microphone to send audible signals from the children's room to the parent's bedroom phone 126. In this configuration the parent's phone 126 would be automatically set for speakerphone and mute such that audio from the children's room would be provided over the parents phone 126 yet no audio would be to the children's room.

Network telephones may also be configured with push buttons and a display. Depending upon implementation detail, to configure a network configuration such as an intercom, the push buttons on a network phone can be associated with a particular room, feature or phone in the house. An interactive display could be provided for user selection at a network telephone. The interactive display could provide for example caller ID, video caller ID, text messaging, network configurations, ring and messaging sequences, and an interactive address book. In one embodiment, one button may be configure a call to all rooms and allow the network devices to act as a paging system. This feature may be useful when trying to locate somebody within the house. Thus, all network address could be broadcasted by a TFPM to activate all phones on the LAN. In an intercom configuration, a "bearer" path may be established between two rooms/phones.

Additionally, intercom 134 or any network device could be placed anywhere in the residence or outside the residence and could be configured to provide audio to network devices or speakers within the residence via a wireless link. In yet another embodiment, parental control features could be implemented on the children's phone 134. For example, parents could limit the duration of calls, dictate the allowable call times (i.e. from 5 P.M. to 7 P.M.), and limited phone numbers which it could be connected to the child's phone.

In yet another embodiment, video data could be sent with the call and displayed on the telephone display. For example, a video identification of the caller could be routed to the phone receiving the call. In yet another implementation, SIP-PF 112 could utilize the caller ID to retrieve a photo ID from memory in the residential gateway and display the photo ID on the selected phone, a television, or a computer monitor such as display 122.

To configure TFPMs 114-120 and SIP-PF 112, a control setup/graphic user interface/display 122 could be utilized. The control setup could utilize a personal computer or a television to provide such an interface. Keyboard 124 could be utilized to input data into the graphical user interface 122. The graphical user interface 122 could be implemented by a browser or any other type of data entry system. In the illustrative embodiment, the display 122 is connected to the control interface 142 that is coupled to the SIP-PF 112 and feature processing modules 114-120.

Figure 2:
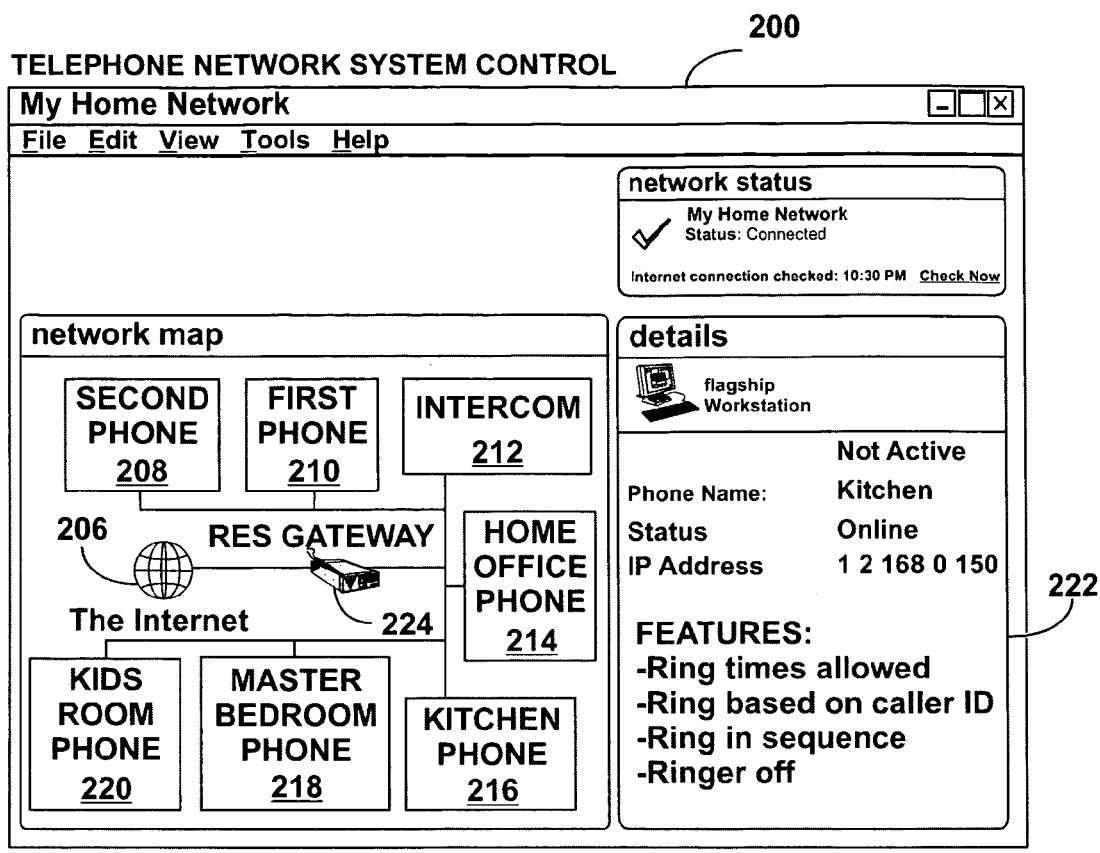
FIG. 2 depicts a graphical user interface for configuring a telephone network.

Referring now to FIG. 2 a graphical user interface that could be provided on the display device 122 in FIG. 1 and utilized to advertise, set up or configure the features described herein is provided. The graphical user interface 200 illustrates a block diagram of a network, wherein the Internet 206 is graphically illustrated as coupled to residential gateway 224, and residential gateway 224 is coupled to first intercom 212, first phone 210, second phone 208, home office phone 214, kitchen phone 216, master bedroom phone 218 and kids phone 220.

In the illustrative embodiment, kitchen phone 216 has been selected by the user and responsive to the selection, enclosed area 222 displays features provided to the kitchen phone 216. For example, the features of ring times allowed, ring based on caller ID, ring in sequence and ringer off or silent mode are all provided for the kitchen phone 216. The above is a small subset of features described herein, and may be provided by the system disclosed. The simplified example of a selection configuration is an illustrative embodiment should not be considered a limiting factor to the disclosure.

In accordance with the illustration, utilizing the graphical user interface 122 of FIG. 1, the user can select a graphical representation of a phone by pointing and clicking on the soft button that represents the phone, and view the configurations and controls selected for the phone and select or modify features to control the network telephone phone. The telephone feature can be integrated into a framework resident in customer premise equipment. The list of features can be utilized to advertise and explain features. Selecting a feature may "walk" a customer through descriptions of the service, a download process or a set up process depending upon the customer's desires.

A management application running on one or more portions of a system like system 100 may be responsive to input from the GUI 122 possibly stored by the system in a local memory. As such, if a user makes a feature selection for kitchen phone 216, one or more TFPMs of a given SIP-PF and/or the SIP-PF itself may be activated instructed or altered to effectuate the selection. For example, an incoming call may be routed to a SIP-PF. The caller may "hear" the telephone ringing while the SIP-PF and associated TFPMs determine how to handle the call. CallerID information associated with the call may compared against the feature settings for kitchen phone 216 by one TFPM, and a call routing decision may be made as a result of the comparison. The call may be identified as "route to voicemail," and a different TFPM may manage the playing of an announcement and the recoding of a message.

Figure 3:
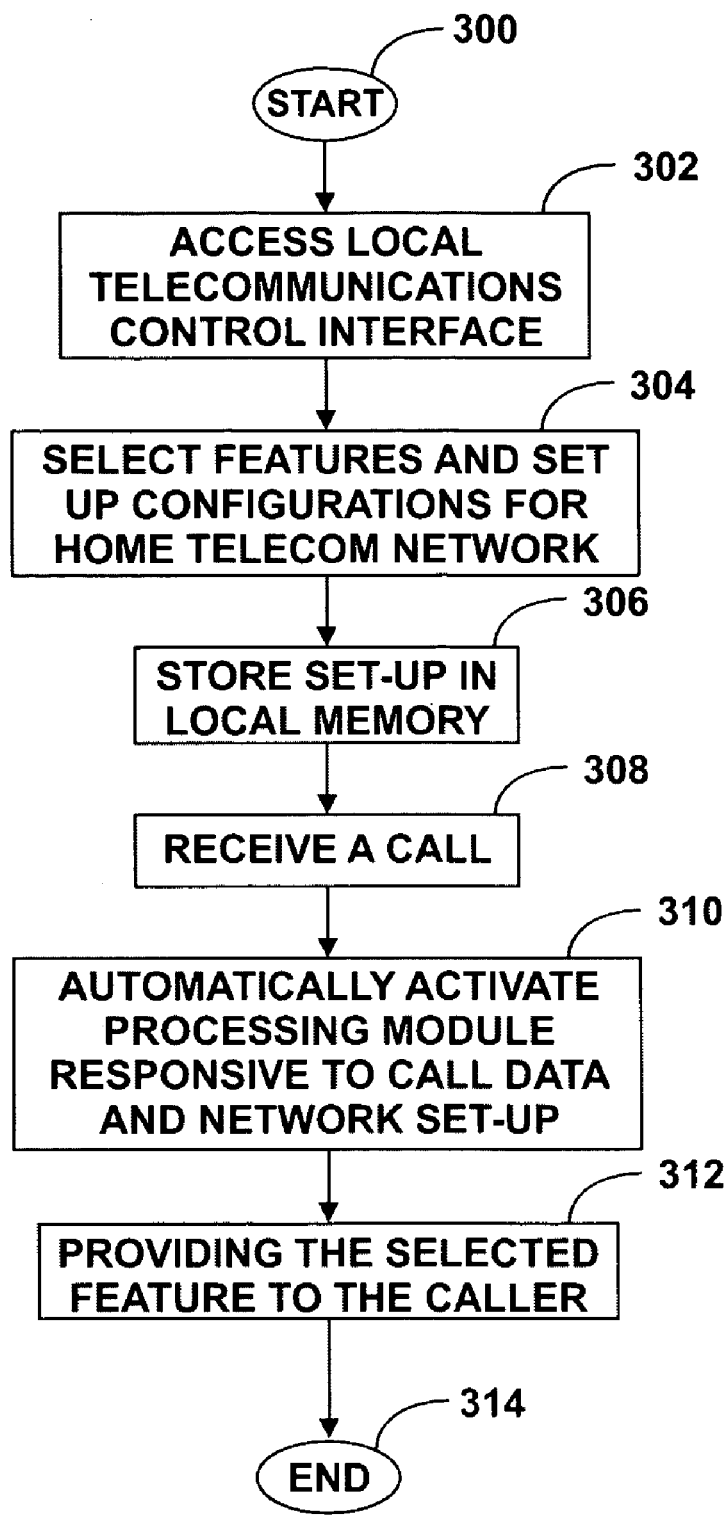
FIG. 3 is a flow diagram that illustrates a method of configuring and operating a telephone network.

Referring to FIG. 3 an illustrative method in accordance with the present disclosure is provided. The process can start at step 300 and proceeds to step 302 where a local communications control interface is accessed. Features are selected or functions are set up for the home telephone network at step 304. The inherent or selectable features can be any of the features disclosed herein and including those suggested by the present disclosure. The selected features and function and other operational parameters are stored in a local memory at 306.

A call can be received at step 308 and at step 310 the features or modules are automatically activated responsive to the call data and the selected network functions and features at step 310. The modules that are selected by the user can receive call data and can utilize the call data to implement the features and functions at step 312 and the process can end at 314.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for configuring and operating a residential telecommunications system comprising:
    a residential gateway configured to receive a call and to output call information associated with the call to a telephony feature-processing framework;
    a local telecommunications control interface operable to configure a selectable system feature and to integrate a selected system feature in the telephony feature processing framework;
    the telephony feature processing framework configured to activate at least one telephony feature module integrated in the framework in response to receiving the associated call information; and
    the at least one telephony feature module configured to process the associated call information and to provide a telephony feature associated with the at least one telephony feature module.

2. The system of claim 1, wherein the local telecommunications control interface provides selectable buttons and a graphic display of at least portions of the selected system features.

3. The system of claim 1, wherein the selectable system features include one of an Intercom, a pager, a music distribution system, a monitor, video caller ID, verbal caller ID, sequential ringing, a selective ringing, distinctive ring, selective ring mute, a ring counter, voice mail routing, a call log, an interactive address book, a distinctive ring-back, selectable ring tones, message routing, video messaging, selective messaging, parental controls, home appliance controls, call forwarding, alarm notification, virtual private network configurations, remote user access, an interactive voice response system, and a voice recognition system.

4. The system of claim 3, wherein the telephony feature module utilizes a caller identification data (ID) to provide a telephone system feature.

5. The system of claim 1, wherein the call is a telephone call.

6. The system of claim 1, wherein the selectable system features are updated.

7. The system of claim 1, wherein a selectable feature is downloaded.

8. The system of claim 1, wherein a user is provided with information and menus for selecting, downloading and configuring selectable features.

9. A system of providing a configurable residential intercom system comprising:
    a first network telephone coupled to a local area network (LAN);
    a second network telephone coupled to the LAN; and
    a residential gateway coupled to the LAIN, the residential gateway configured to accept a control signal and to output information associated with the control signal to a telephony feature-processing framework: and
    the telephony feature processing framework configured to provide at least a partial audio connection between the first network telephone and the second network telephone.

10. The method of claim 9, further comprising a user interface on the first network telephone the user interface configured to provide a control signal responsive to user input.

11. The method of claim 9, wherein the first network device transmits data to the second network device utilizing a Session Initiated Protocol.

12. The method of claim 9 wherein responsive to user input the first network phone can send one of a ring signal, a speaker phone activation signal and an audio signal to the second network telephone via a telephony feature processing module integrated into the telephony feature-processing framework.

13. The method of claim 9, wherein responsive to data associated with the incoming call, the first network telephone can perform functions.

14. The method of claim 9, wherein the second network telephone can be muted by a control signal from the first network telephone.

15. The method of claim 9, wherein the one of the first and second network telephones are wireless devices.

16. The method of claim 9, wherein a bearer path is established between the first and second network telephones.

17. A method for configuring a residential telecommunication network comprising:
    displaying a representation of at least one network device on a graphical user interface (GUI);
    selecting the displayed representation of the network telephone utilizing a pointing device;
    displaying a representation on the GUI of at least one selectable feature available to be integrated into a telephony feature-processing framework and to control the selected network phone;

selecting a displayed representation of the selectable feature utilizing a pointing device;
storing the selected features of the selected network telephone;
receiving a call at a residential gateway configured to output call information associated with the call to the telephony feature-processing framework; and
controlling the residential telephone network telephone responsive to the selected features.

18. The method of claim 17, wherein selecting the displayed representation further includes pointing to a displayed representation and clicking on a soft button representing one of a network telephone and a displayed feature.

19. The method of claim 17, wherein the displayed feature is one of an Intercom, a pager, a monitor, video caller ID, verbal caller ID, sequential ringing, a selective ringing, distinctive ring, selective ring mute, a ring counter, voice mail routing, a call log, an interactive address book, a distinctive ring-back, selectable ring tones, message routing, video messaging, selective messaging, parental controls, home appliance controls, call forwarding, alarm notification, virtual private network configurations, remote user access, and call logs.

20. A method for controlling a residential telecommunication network comprising:
integrating a telephone feature module into a framework resident in a piece of customer premises equipment located at the customer premises;
receiving an incoming call at a residential gateway located at the customer premises and configured to output data associated with the call to utilizing a Session Initiated Protocol (SIP) framework, the incoming call having data; and
distributing the data from the SIP framework to a selected telephone feature module based on a user selected configuration.

21. The method of claim 20, further comprising processing the data by the selected module to provide the selected feature at the premise.

22. The method of claim 20, further comprising:
coupling telephone transceivers to the framework via a local area network; and
sending signals to the telephone transceivers based on the call data and the selected feature.

23. The method of claim 20, further comprising processing data associated with the incoming call and ringing network telephone devices based on the call data and the selected feature.

24. The method of claim 20, further comprising processing the data to provide one of the following features, an Intercom, a pager, a monitor, video caller ID, verbal caller ID, sequential ringing, a selective ringing, distinctive ring, selective ring mute, a ring counter, voice mail routing, a call log, an interactive address book, a distinctive ring-back, selectable ring tones, message routing, video messaging, selective messaging, parental controls, home appliance controls, call forwarding, alarm notification, virtual private network configurations, remote user access, and call logs.

25. The method of claim 20, further comprising downloading at least one of the feature processing modules over the wide area network.

26. A method for operating a home telephone switching network comprising:
storing a user selected telephony feature, the user selected telephony feature implemented by at least one telephony module;
registering a local network transceiver at a Session Initiated Protocol Proxy Framework (SIP-PF), the SIP-PF coupled to a wide area network (WAN);
receiving a call at a residential gateway in communication with the SIP-PF;
routing call data associated with the call to the SIP-PF; end sending the call data to the at least one telephony module based on the selected feature; and
processing the call data at the telephony module to provide a selected telephony feature for the registered local network transceiver.

27. The method of claim 26, wherein the registered local network transceiver is a wireless transceiver.

28. The method of claim 26, wherein the telephony feature is selected utilizing a graphical user interface operably coupleable to the SIP-PF.

29. The method of claim 26, further comprising providing the local network transceiver with a Session Initiate Protocol Universal Resource Locator.

30. The method of claim 26, further comprising a telephony feature-processing module configured to provides a firewall for the home telephone-switching network.

31. A computer readable medium tangibly embodying a program of instructions to manipulate a computing platform to:
store a user selected telephony feature;
register a local network transceiver at a Session Initiated Protocol Proxy Framework (SIP-PF);
receive a call and call data at the SIP-PF from a residential gateway in communication with the SIP-PF;
send the call data to a telephony feature-processing module based on the stored user selected telephony feature; and
process the call data at the telephony module to provide a selected telephony feature for the registered local network transceiver.

32. The computer readable medium of claim 31, further including instructions to provide one of the following features, an Intercom, a pager, a monitor, video caller ID, verbal caller ID, sequential ringing, a selective ringing, distinctive ring, selective ring mute, a ring counter, voice mail routing, a call log, an interactive address book, a distinctive ring-back, selectable ring tones, message routing, video messaging, selective messaging, parental controls, home appliance controls, call forwarding, alarm notification, virtual private network configurations, remote user access, and call logs.

* * * * *